United States Patent [19]

Cole et al.

[11] Patent Number: 5,621,857
[45] Date of Patent: Apr. 15, 1997

[54] METHOD AND SYSTEM FOR IDENTIFYING AND RECOGNIZING SPEECH

[75] Inventors: Ronald A. Cole; Mark A. Fanty, both of Portland, Oreg.

[73] Assignee: Oregon Graduate Institute of Science and Technology, Portland, Oreg.

[21] Appl. No.: 811,819

[22] Filed: Dec. 20, 1991

[51] Int. Cl.$^6$ .................................. G10L 5/06; G10L 9/00
[52] U.S. Cl. .............................. 395/2.41; 395/24; 395/21
[58] Field of Search ................................... 381/41, 43, 30; 395/2, 2.63, 22, 2.1, 2.11, 2.4, 2.41, 2.65, 2.64, 2.6, 20–25, 23; 382/153–159

[56] References Cited

U.S. PATENT DOCUMENTS

| | | | |
|---|---|---|---|
| 4,040,215 | 8/1977 | Amano et al. | 381/43 |
| 4,752,179 | 6/1988 | Levinson | 381/43 |
| 4,813,076 | 3/1989 | Miller | 395/2.63 |
| 4,852,170 | 7/1989 | Bordeaux | 381/41 |
| 4,852,172 | 7/1989 | Taguchi | 381/43 |
| 4,856,067 | 8/1989 | Yamada et al. | 381/45 |
| 4,905,285 | 2/1990 | Allen et al. | 381/41 |
| 4,908,865 | 3/1990 | Doddington et al. | 381/43 |
| 4,937,872 | 6/1990 | Hopfield et al. | 381/43 |
| 4,944,012 | 7/1990 | Morio et al. | 381/30 |
| 4,977,599 | 12/1990 | Bahl et al. | 395/2.65 |
| 5,023,912 | 6/1991 | Segawa | 381/43 |
| 5,121,428 | 6/1992 | Uchiyama et al. | 381/43 |
| 5,212,730 | 5/1993 | Wheatley et al. | 381/43 |
| 5,263,097 | 11/1993 | Katz et al. | 395/22 |
| 5,278,911 | 1/1994 | Bickerton | 381/43 |

OTHER PUBLICATIONS

Mark Fanty and Ron Cole, "Speaker-Independent English Alphabet Recognition: Experiments with the E-Set", Proceedings of the International Conference on Spoken Language Processing, Kobe, Japan, Nov., 1990.

Richard P. Lippmann and Ben Gold, "Neural–Net Classifiers Useful for Speech Recognition", IEEE 1st Inter Conf. on Neural Networks Jun.21, 1987.
Mahesan Niranyan, Frank Fallside, "Speech Feature Extraction using Neural Networks". Lecture Notes in Computer Science, Feb. 15–17, 1990.
Mike Chong & Frank Fallside, "Classification & Regression Tree Neural Networks for Automatic Speech Recognition". Jul. 9–13, 1990. Inter Neural Net. Conf.
C. Rogers et al, "Neural Network Enhancement for a two Speaker Separation System".

Primary Examiner—Tariq R. Hafiz
Attorney, Agent, or Firm—Kolisch, Hartwell, Dickinson, McCormack & Heuser

[57] ABSTRACT

Improved system and method for speaker-independent speech token recognition are described. The system is neural network-based and involves processing a sequence of spoken utterances, e.g. separately articulated letters of a name, to identify the same based upon a highest probability match of each utterance with learned speech tokens, e.g. the letters of the English language alphabet, and based upon a highest probability match of the uttered sequence with a defined utterance library, e.g. a list of names. First, the spoken utterance is digitized or captured and processed into a spectral representation. Second, discrete time frames of the DFT are classified phonetically. Third, the time-frame outputs are used by a modified Viterbi search to locate segment boundaries, near which such segment boundaries lies the information that is needed to discriminate letters. Fourth, the segmented or bounded representation is reclassified using such information into individual hypothesized letters. Fifth, successive, hypothesized letter scores are analyzed to obtain a high probability match with a spelled word within the utterance library. The system and method comprehend finer distinctions near points of interest used to discriminate difficult-to-recognize letter pair differences such as M/N, B/D, etc. The system is described in the context of phone line reception of names spelled by remote users.

1 Claim, 4 Drawing Sheets

OTHER PUBLICATIONS

Cole et al, "speaker independent vowel recognition: comparison of backpropagation and trained classification trees"; Proceedings of the twenty–third annual hawaii international conference on system sciences, pp. 132–141 vol. 1, 2–5 Jan. 1990.

Sawai et al, "TDNN–LR continuous speech recognition system using adaptive inremental TDNN training"; ICASSP '91, pp. 53–56, 1991.

Sawai et al, "Parallelism, hierarchy scaling in time–delay neural networks for spotting japanese phonemes/cv–syllables"; 1989 IEEE International conference on neural networks, pp. 11–81 to 11–88, 1989.

Cole et al, "Speaker–independent recognition of spoken english letters"; IJCNN, pp. 45–51 vol. 2, 17–21 Jun. 1990.

Rossen et al, "A connectionist model for consonant–vowel syllable recognition"; ICASSP 88, pp. 59–62 vol. 1, 11–14 Apr. 1988.

Creekmore et al, "A comparative study of five spectral representations for speaker–independent phonetic recognition"; Conference record of the twenty–fifth asilomar conference on signals, systems and computers, pp. 330–334 vol. 1, 4–6 Nov. 1991.

Gedo et al, "Automatic speaker recognition system using the discrete hartley transform and an artificial neural network"; Conference record of the 25rh Asilomar Conference on signals, systems and computers, pp. 1151–1154 vol. 2, 4–6 Nov. 1991.

Rogers et al, "Neural Network enhancement for a two speaker separation system"; ICASSP–89: 1989 International Conference on Acoustics, Speech and signal processing, pp. 357–360 vol. 1, 23–26 May 1989.

Leung et al, "Speech recognition using stochastic segment neural networks"; pp. 613–616 vol. 1, 23–26 Mar. 1992.

METHOD AND SYSTEM FOR IDENTIFYING AND RECOGNIZING SPEECH

BACKGROUND AND SUMMARY OF THE INVENTION

This invention relates generally to speech token recognition systems. More particularly, the invention concerns such systems that are capable of recognizing spoken utterances, e.g. separately vocalized letters or other tokens, that are within a library developed by neural network-based learning techniques.

Speech recognition systems proliferate. Conventionally, speech recognition system development is in the area of speaker-dependent systems, and has focused upon individual user adaptation, i.e. they have been designed increasingly accurately to recognize words and phrases spoken by a particular individual in accommodation of that individual's vocalization idiosyncracies.

More recent developments in neural modeling enable higher speed and increasingly fine adjustment to speech recognition algorithms, with modestly improved separated speech token recognition accuracy and greatly improved versatility that result in part from the learning capabilities of neural model- or network-based systems. Some such developments have been reported by us in "Spoken Letter Recognition", Proceedings of the Third DARPA Speech and Natural Language Workshop, Somerset, Pa., June, 1990, which report is incorporated herein by this reference and familiarity with which is assumed.

The English alphabet is a challenging vocabulary for computer speech recognition because of the acoustic similarity of many letter pairs (e.g., B/D, B/V, P/T, T/G and M/N). Research has led to systems that perform accurate speaker-independent recognition of spoken letters using high quality or telephone speech, as described more recently in Mark Fanty and Ron Cole, "Speaker-Independent English Alphabet Recognition: Experiments with the E-Set", Proceedings of the International Conference on Spoken Language Processing, Kobe, Japan, November 1990 and Ronald Cole, Krist Roginski and Mark Fanty, "English Alphabet Recognition with Telephone Speech", Proceedings of 2nd European Conference on Speech Communication and Technology, Genova, Italy, September 1991.

There is yet a felt need for further improvement in the ability of speech-recognition systems to become speaker independent, by which is meant systems capable of recognizing the speech of a large universe of speakers having idiosyncratic speech patterns, which requires no retraining or adaptive techniques but instead accurately can interpret words or phrases spoken by an individual whose speech has never before been heard by the system. There also is need to further improve techniques used in such systems for discerning subtle differences among utterances—especially in the nature of separated, spoken letters—in order to increase the accuracy with which such utterances are classified. Finally, there is need to further develop neural-network-based systems that are more readily adaptable or trainable to a different set of recognized vocabulary entries characterized by a different set of sonorant or phonetic components, e.g. a foreign language having different vocalization patterns; and to a different set of spectral components, e.g. utterances received over a voice phone line.

Briefly, the invention is a neural-network-based system having five basic processing components: (1) data capture and signal representation utilizing spectral analysis; (2) phonetic classification of discrete time frames; (3) location of speech segments in hypothesized tokens or letters; (4) reclassification of hypothesized tokens or letters; and (5) recognition of spelled words from the classified letter scores. Importantly, phoneme classification involves a phoneme set that represents a substantial number of the tokens (or what will be referred to herein also as morphemes) in, for example, the English language alphabet, and the reclassification makes fine phonetic distinctions between difficult to discriminate tokens or letters in such vocabulary. The system is described in an application in which names spelled over phone lines are recognized with a high degree of accuracy as being within a defined library.

DETAILED DESCRIPTION OF THE PREFERRED EMBODIMENT

Generally, the speech token recognition system utilizes a neural model (i.e. neural simulator), or what will be referred to herein as a neural network, for developing a vocabulary of recognizable spoken utterances such as spelled names that appear as telephone directory entries in an automatic directory assistance application. It will be understood that such an application is only one of a myriad of applications for such a speech token recognition system, and that all suitable applications are within the spirit of the invention.

The system in its preferred embodiment consists of a succession of neural network processors configured generally as described in our above referenced "Spoken Letter Recognition" report. As will be seen, the preferred system and method of the invention represent a significant improvement over even the most advanced of the previously described systems and methods.

Preferably, there are five processing components, or processing stages, implemented by the invented system: (1) data capture and signal representation, (2) phonetic classification of discrete time frames, (3) location of speech segments in hypothesized letters, (4) reclassification of hypothesized letters, and (5) recognition of spelled words from the classified letter scores. These components or stages will be described in the context of a system that recognizes spelled (English-language alphabet) names over phone lines.

Figure 2:
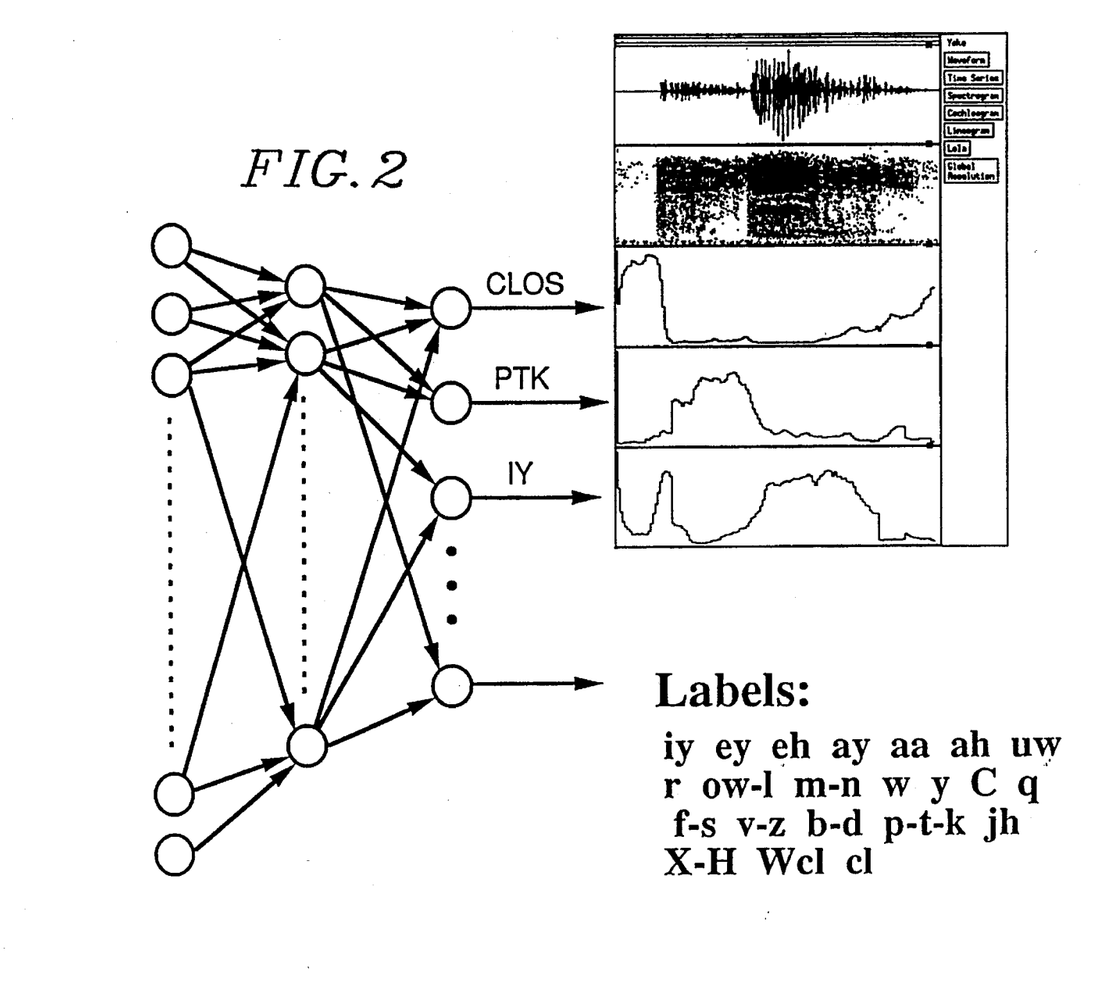
FIG. 2 is a schematic diagram of a neural network-based classifier network and associated, displayed input waveform, spectrogram and phoneme output representations illustrating various processing steps of the preferred method.
Figure 4:
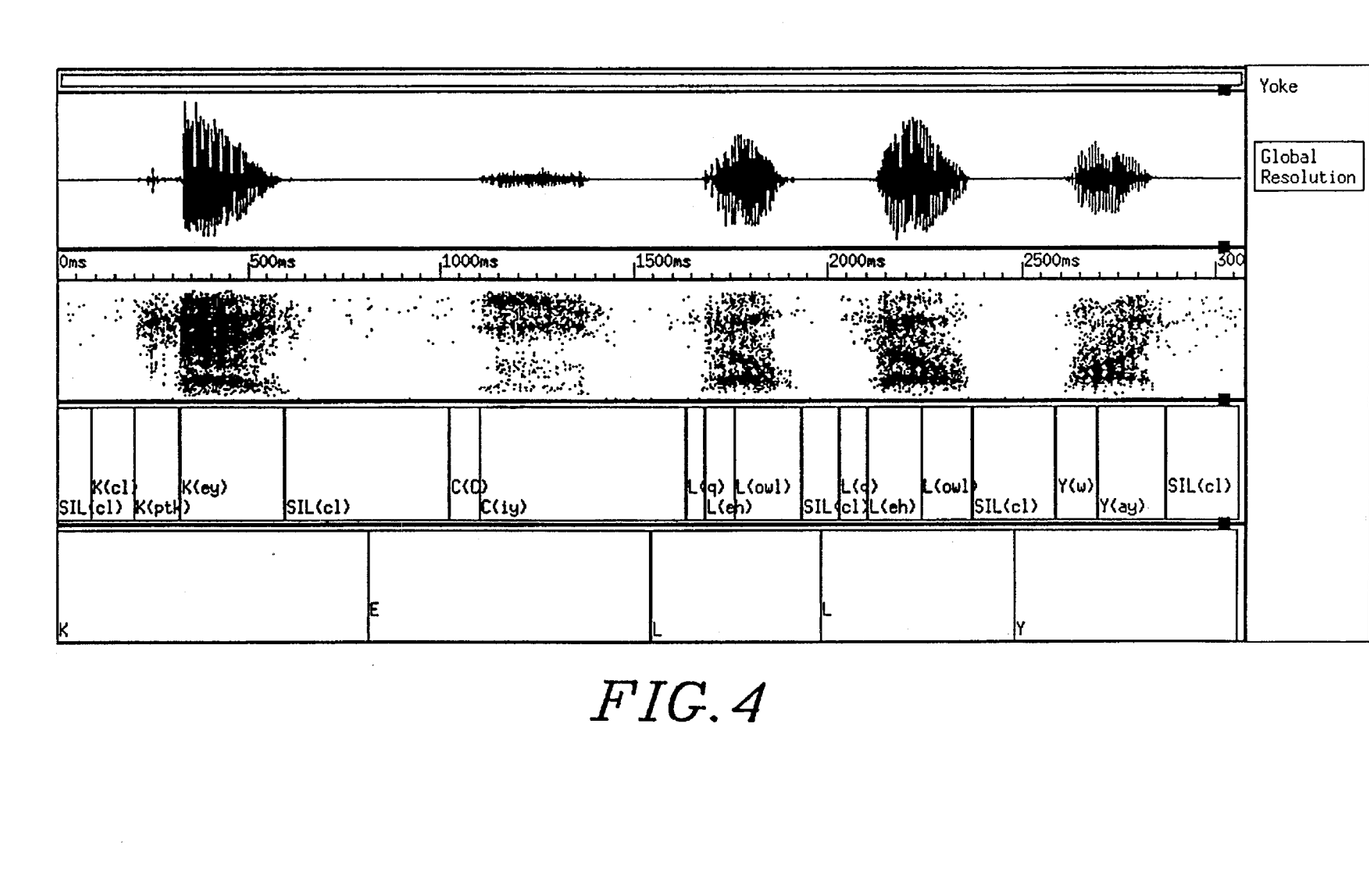
FIG. 4 is an input waveform, spectrogram, segmentation and letter classification display window of the invented system.

The system answers the phone and asks the caller to spell a word. The speech is sampled at 8-kHz at 14-bit resolution. The system detects when the caller has stopped speaking. A perceptual linear predictive (PLP) analysis is performed every 3-msec three milliseconds (msec) on 10-msec speech segments. While PLP analysis has been found to achieve the advantages of the invention, it will be appreciated that the invented system and method do not depend thereon, and that alternative spectral analysis techniques, e.g. the discrete Fourier transform (DFT), may be used. (FIGS. 2 and 4 show displays of the DFT spectrogram, rather than the PLP spectrogram, because the former are easier to read.). The result of this processing stage is to transform the continuously varying speech waveform into a sequence of discrete time frames which contains information about the spectral energy of the signal.

The system also computes the zero-crossing rate and peak-to-peak (ptp) amplitude over 10-msec windows. The zero-crossing rate measures the number of times the signal changes sign. The ptp amplitude is the absolute difference between the largest positive and the largest negative peaks in a given window.

The next stage of analysis uses the PLP coefficients to assign twenty-two phonetic category scores to each 3-msec time frame. Classification is performed by a fully-connected, three-layer, feed-forward neural network. The twenty-two labels provide an intermediate level of description, in which preferably only a few phonetic categories are combined (see Table 1). More refined phonetic distinctions are performed during letter classification, described below.

TABLE 1

PHONETIC SEGMENTATION CATEGORIES

| name | description |
| --- | --- |
| cl | stop closure and silence |
| Wcl | closure between syllables in W |
| q | glottal stop |
| b/d | [b] or [d] |
| p/t/k | [p], [t] or [k] |
| jh | [jh] in J |
| X/H | [ks] in X or [ch] in H |
| c | [s] in C |
| f/s | [f] in F or [s] in S |
| v/z | [v] or [z] |
| m/n | [m] or [n] |
| r | [r] |
| y | [y] beginning U |
| ow/l | [ow] in O or [l] |
| ey | [ey] in A |
| iy | [iy] in E |
| eh | [eh] beginning S |
| aa | [aa] beginning R |
| uw | [uw] ending U |
| ah | [ah] in first syllable of W |
| w | [w] beginning Y |
| ay | [ay] in I |

The neural network was trained on hand-labeled speech data from two hundred speakers who spelled names and recited the English alphabet. The input to the neural-network classifier consists of features representing PLP coefficients in a 432-msec window centered on the frame to be classified. The manner in which PLP coefficients are averaged across 3-msec time frames is represented in FIG. 1.

Figure 1:
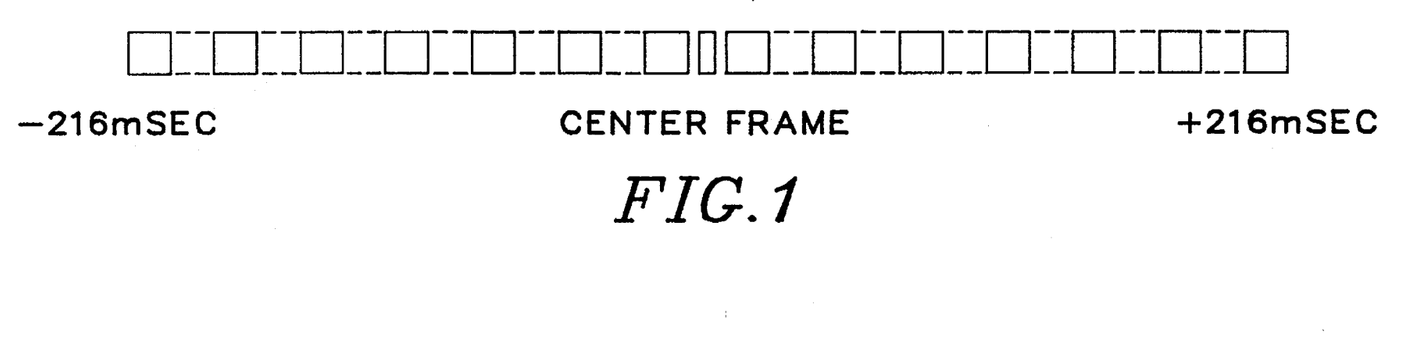
FIG. 1 is a schematic representation of the sampling strategy used to input spectral features to the frame-based classifier, in accordance with the preferred method of the invention.

It will be understood from the discussion immediately above that FIG. 1 illustrates the averaging of selected (solid outlined) 3-msec time frames over the entire interval to determine the output of a single, centered frame, and that such averaging produces a score for the center frame that comprehends frames prior to (to the left of in FIG. 1) and subsequent to (to the right of in FIG. 1) the center frame. Those of skill in the art will appreciate that such averaging is performed (over such an interval in which is centered the frame being scored) multiple times, with the interval taking into account time-shifted versions of the utterance. The neural network outputs at each centered time frame represent the twenty-two phonetic category scores corresponding to Table 1, with each network output, or output node, representing a higher or lower score, or probability, that the analyzed interval of the utterance represents the particular phoneme category (listed in Table 1) assigned to that network output's node.

Accurate frame-based phonetic classification depends on the correct choice of features and the correct proportion of sampled speech frames near segment boundaries and within segments when training the classifier. The selection and sampling of features was determined empirically. (Refer, for example, to our above-referenced "Speaker-Independent English Alphabet Recognition . . . " and "English Alphabet Recognition with Telephone Speech" reports.

FIG. 2 shows schematically how the frame-by-frame inputs to the neural network are translated into the set of twenty-two phonetic category scores (listed in Table 1) at each time frame. FIG. 2 also shows graphically the time-aligned, sample input waveform, PLP (represented instead by DFT energy spectra and selected phoneme outputs, in various display windows, that are produced by phonetic classification in accordance with the preferred system and method of the invention. The features derived from PLP are input to the neural network at each time frame. These features are scaled to have values between predefined lower and upper limits. These input values are then multiplied by the learned weights on the connections from the input layer to the middle layer of neurons in the network. The resulting products are summed and passed through a sigmoid function to produce the output value for each neuron in the middle layer. This process is repeated to produce values between 0 and 1 at the output layer. The time-aligned phoneme outputs, or output values, for three phonetic categories are shown below the speech, signal's input waveform depicted in FIG. 2.

The next stage of classification uses the twenty-two category scores at each time frame to find the best scoring sequence of phonetic segments corresponding to a sequence of letters, or what will be understood by those skilled in the art to be a set of any of a variety of morphemes having linguistic, as opposed to phonetic, significance. The purpose of this stage is to locate accurately the segment boundaries of the hypothesized letters. Note that some letter pairs, such as M/N and B/D, are not distinguished at this stage. The frame-by-frame outputs of the phonetic classifier are converted to a sequence of phonetic segments corresponding to hypothesized letters by combining the phonetic category scores with duration and phoneme sequence constraints provided by the letter models shown in Table 2.

Figure 3:
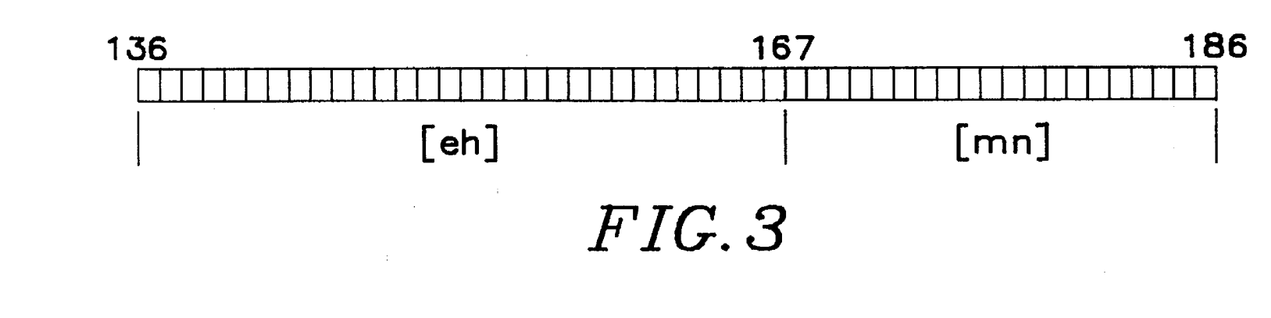
FIG. 3 is a schematic frame number representation of the M/N letter model illustrating the alignment of an utterance with a vocabulary entry.

For example, the letter model for M/N consists of optional glottalization ([q]), followed by the vowel [eh], followed by the nasal murmur [m/n]. Each of these segments has duration probabilities computed from the training data. For example, the sequence [eh m/n] shown in FIG. 3 is given a score equal to the product of the [eh] outputs in frames 136 through 165, the [m/n] outputs in frames 166 through 185, the probability that [eh] in M/N has duration 30, and the probability that [m/n] in M/N has duration 20.

Besides the twenty-one regular letter models (listed in Table 2), there are models for SILENCE and NOISE. The SILENCE model matches the [cl] output of the frame classifier, which is trained on between-letter pauses, beginning and ending silence, and on the closure in X and H. Because background noise is often classified as [f/s] or

[m/n], the NOISE model was added, which consists of either of these phonemes in isolation (no [eh]). It will be appreciated that, in Table 2, token representations consist of a succession of one or more of the target phonemes listed in Table 1, separated by spaces. The spaces between phonemes imply the sequential nature of the phonemes. They do not imply vocalization or silence between successive phonemes.

Right virgules (/) that appear between adjacent letters or phonemes in Table 2 represent plural letter or phoneme possibilities ('candidates') not resolved, if at all, until a later stage of processing. For example, p/t/k as it appears as the second state of the letter K processor refers to the fact that the p, t or k neural network node (a singular node, not three different nodes) was energized at a high probability (or high score). As may be seen from Table 2, it is enough in identifying the letter K that a p/t/k phoneme was followed by an ey phoneme, thus distinguishing it from the letter pair P/T, which is characterized instead as ending with an iy phoneme. Those skilled in the art will appreciate that the individual letters within the more difficult-to-discriminate letter pairs, namely B/D, F/S, M/N, P/T and V/Z, are discriminated from one another by a separate (neural-based) classifier that examines selected features of the utterance, to be described by reference to FIG. 5.

TABLE 2

LETTER SEGMENTATION MODELS

| letter | states (parenthetical elements are optional) |
|---|---|
| A | (q) ey |
| B/D | cl b/d iy |
| C | C iy |
| E | (q) iy |
| F/S | (q) ch f/s |
| G | cl jh iy |
| H | (q) ey cl X/H |
| I | (q) ay |
| J | cl jh ey |
| K | cl p/t/k ey |
| L | (q) eh owl |
| M/N | (q) eh m/n |
| O | (q) ow/l |
| P/T | cl p/t/k iy |
| Q | cl P/t/k y uw |
| R | (q) aa r |
| U | (q) y uw |
| V/Z | v/z iy |
| W | cl b/d ah Wcl (b/d) (ow/l) y uw |
| X | (q) eh cl X/H |
| Y | (q) w ay |
| SILENCE | cl |
| NOISE | (f/s) (m/n) |

A modified Viterbi search is used to find the sequence of complete letter models with the highest probability or score. Any number of SILENCE and NOISE segments are allowed between letters. The search proceeds left to right. At each time step, there is a single active cell for each state of each letter model representing the best score of all paths which reach that state at that time. A back-trace list provides the history of that best path. The scores for time t depend on the scores for time t−1 and the phonetic outputs for time t. An assumption underlying this Viterbi search is that of all the paths which converge on a state at a given time, only the one with the highest score need be kept. If the future behavior is completely determined by the current state, this assumption is correct.

Unfortunately, the addition of duration probabilities invalidates the assumption. Two paths which enter a state at different times will have different duration penalties applied sometime in the future. Strictly speaking, the best-scoring path for each entry time should be maintained. This is quite expensive, however.

As a compromise, certain times which are more likely to be segment boundaries are marked. The best path entering at each of these special times is kept, as well as the best overall path (for any entry time). Likely boundary times are determined by summing the differences in phonetic classification scores over all categories, and thresholding, by which is meant a determination of the extent of such differences relative to predetermined, empirically derived threshold differences. If a large number of phonetic categories have a large output change around frame 14 (e.g [b] went from high in frames 12 and 13 to low in frames 15 and 16), then frame 14 is a likely boundary. If the scores before and after frame 14 are about the same, then it is not.

The first (top) display window in FIG. 4 shows the digitized, spoken utterance waveform; the second window shows the PLP (represented instead by DFT) spectral energy graph; the third window shows the alignment for the letters in K-E-L-L-Y; and the fourth (bottom) window shows the correct letter classification of the spoken utterance "K-E-L-L-Y." Note that letter classification in accordance with the invented system and method corrected an E/C error in the second letter segment Note also that, for the sake of clarity in the illustration, "NOISE" segments have been removed.

The goal of letter classification is to classify correctly the hypothesized letter. A new set of feature measurements is computed using the segment boundaries found by the previous module. The rationale for this stage is that information about phonetic categories is found in certain regions of the signal, often near segment boundaries. For example, information needed to discriminate B from D is found just after consonant release, and in the first 15-msec of the vowel (phoneme iy). Similarly, the information needed to discriminate M from N is found mainly in the vowel interval (phoneme eh) preceding the onset of nasalization. By first locating the phonetic segments, it is possible to measure, or to analyze features that optimize discrimination of the tokens in a given vocabulary. For example, feature measurements advantageously may be used in letter classification of sample speech frames just following vowel onset and just before a vowel nasal boundary.

To perform letter classification, a set of features is computed for each hypothesized letter and used by a fully connected, feed-forward network with one hidden layer to reclassify the letter. Feature measurements are based on the phonetic boundaries provided by the segmentation. At present, the features consist of 1) duration of the initial consonant;

2) duration of the sonorant;

3) PLP coefficients averaged over thirds of the initial consonant;

4) PLP coefficients averaged over sevenths of the sonorant;

5) PLP coefficients averaged over the first three 70-msec intervals after the first sonorant;

6) PLP coefficients 6-msec and 15-msec into the sonorant;

7) PLP coefficients 30 msec and 6 msec before any sonorant-internal boundaries (e.g. [eh] and [m]), or mid-sonorant if there are no boundaries;

8) average zero crossing in seven intervals from 180-msec before the sonorant, from fourths of the sonorant, and in seven intervals from the 180-msec after the sonorant; and 9) average ptp amplitude in seven intervals from 180-msec before the sonorant, from fourths of the sonorant, and in seven intervals from 180-msec after the sonorant. The outputs of the classifier are the twenty-six letters plus the category "NOT A LETTER" ("SILENCE" or "NOISE").

Training data is generated by using the segmenter in a forced alignment scheme. A training utterance is first segmented with the Viterbi search constrained to use the known letter sequence, resulting in accurate alignment. The letter boundaries are fixed and the utterance is resegmented without knowledge of the correct letter sequence. These phoneme boundaries—similar to those which will be encountered during use of the system—are used to generate training data for each letter. If additional letters are found during this 'free' segmentation, they are assumed to be noise and are used to train the "NOT A LETTER" category.

The output of the letter classifier is a score between 0.0 and 1.0 for each letter. These scores are treated as probabilities and the most likely name is retrieved (e.g. by multiplying letter probabilities) from the database of, for example, 50,000 last names. Preferably, the database is stored in an efficient tree structure so that common prefixes are shared.

Letter deletions and insertions are allowed with a penalty. The score for a name is the product of the letter scores for each letter in the name and any insertion or deletion penalties.

Figure 5:
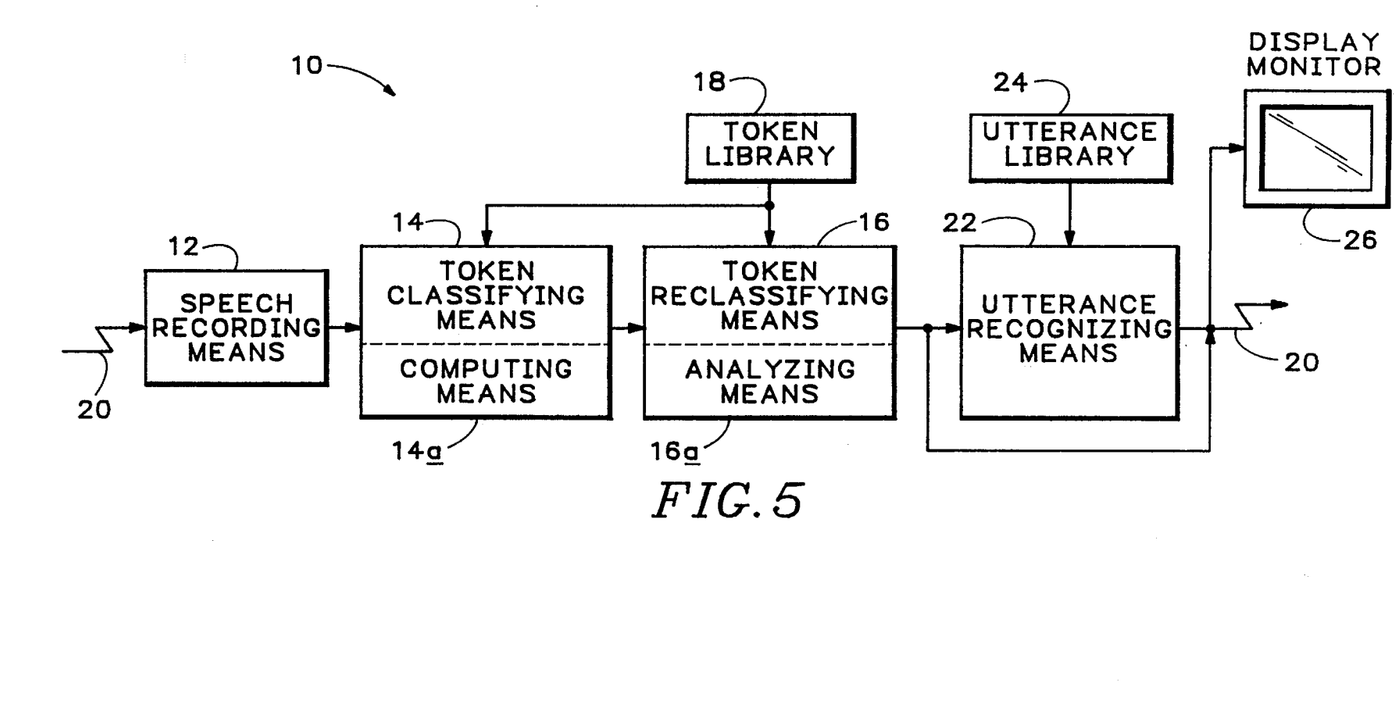
FIG. 5 is a system architecture/control flow diagram of the preferred system and method of the invention.

Referring now to FIG. 5, the invention in its preferred embodiment and by its preferred method may be understood. Indicated at 10 in FIG. 5 is the preferred system architecture/process control flow. Speech or speech token recognition system 10 is represented as an organization of processors, or process steps, including generally speech recording means 12 for producing a representation of a spoken utterance, neural-network-based token- or phoneme-classifying means 14 coupled thereto, neural-network-based token- or phoneme-reclassifying means 16 responsive to token-classifying means 14 and connected to a plural token library 18. Speech-recording means 12 may be seen to be responsive to spoken utterances received over a communication channel such as a telephone line 20, and token reclassifying means 16 may be seen to effect a high-probability indication that the utterance recorded by speech-recording means 12 has been recognized.

It will be appreciated that reclassified tokens produced by reclassifying means 16 may be further processed by utterance recognizing means 22 connected to an utterance library 24 to determine whether the token sequence produced by token reclassifying means 16 represents a recognizable utterance. Such an indication would be application specific, and for example, might be displayed on a monitor 26 and/or might result in some form of acknowledgement via telephone line 20 to the person whose spoken utterance has been recognized. The acknowledgement might take the form of a spoken or played back, recorded response regarding the phone number of a person whose name was spelled by the speaker. It will be appreciated that phone lines 20 physically may be one or more conventional, dedicated or switched, simplex or duplex lines.

Token classifying means 14 is for classifying successive, equally lengthed, time frame-based segments, of such a recorded utterance representation produced by speech-recording means 12 over a first predetermined time interval into a plurality of phoneme-specific partial probabilities. It will be understood that the first predetermined time interval over which such token classification occurs, and that the successive segments that are classified by token classifying means 14 preferably are as illustrated in FIG. 1 as spanning several hundred milliseconds. In FIG. 1, the solid boxes indicate intervals over which PLP coefficients are averaged, while the dashed boxes indicate intervals that are skipped.

The plurality of phoneme-specific partial probabilities are so-called because they represent incomplete token recognition of a spoken utterance. For example, the p/t/k phoneme triplet recognition indicated in Table 1 may be seen to represent only a partial probability that the spoken token was a P, since the spoken token might just as well have been a T or a K. Similarly, the P/T letter pair recognition indicated in Table 2 may be seen to represent only a partial probability that the spoken token was a P, since the spoken token might just as well have been a T. Thus, phoneme-specific partial probabilities produced by token classifying means 14 are used herein to describe the output of token classifying means 14, e.g. the hypothesized phonemes in Table 1, as well as the intermediate letter-specific partial probabilities produced in token reclassifying means 16, e.g. the hypothesized letters in Table 2. In the latter case, as well as in the former case, further, feature-specific, processing is performed in accordance with the invention in order to discriminate each letter of the alphabet from every other to a high degree of certainty.

Token classifying means 14 includes means 14a for computing the above-described partial probabilities to produce one or more phoneme-specific probability indices for successive segments of the spoken utterance representation. It will be appreciated that, in accordance with the preferred embodiment of the invention, such phoneme-specific probability indices are in the form of the scores described above as being a number between 0.0 and 1.0, and that the computing means is embodied within the neural networks that implement token classifying means 14.

Reclassifying means 16 is for reclassifying the successive segments classified by token classifying means 14 over a second predetermined time interval into one or more recognizable tokens, or letters. The importance of the fact that the reclassifying time interval is different from the first is that fine phonetic distinctions, e.g. between difficult-to-discriminate letters of letter pairs such as B/D, F/S, M/N, P/T and V/Z, have been found more accurately to be made when they are based upon features that are found immediately around phoneme segment boundaries. For example, feature measurements in a few millisecond (msec) interval immediately following consonant release has been found greatly to improve the ability of system 10 to discriminate B from D. Such interval is much shorter than the several hundred millisecond interval over which phoneme classifying occurs within phoneme classifying means 14 to produce the intermediate indication that the spoken utterance was [b] or [d] (see Table 1).

Token reclassifying means 16 produces a vector containing one or more token scores and may be seen operatively to effect a high-probability indication, e.g. in excess of 96% over relatively low-noise communication channels such as a directly connected microphone (and only slightly lower, e.g. –90%, over relatively high-noise communication channels such as phone lines), indication of which one or more recognizable tokens in token library 18 is represented by the recorded utterance. Thus, token classifying means 14 may be thought of as performing the process steps of 1) segmenting a vocalized speech component to produce a representation of the component characterized by plural time-based segments, e.g. by scoring the sequential time-based frames as to the various probabilities that they represent one of the phonemes in token library 18 and by performing a modified Viterbi search to produce an optimally segmented representation of a high-probability phoneme occurrence, and 2) classifying each such segment by mapping the same using a plural target-token vocabulary-based phonetic library to produce a high probability phoneme representation of the component.

Mapping each segment using a plural target-token vocabulary-based phonetic library produces a higher probability phoneme representation of a speech component than prior classifying schemes because of the unique formulation of the target-token vocabulary-based phonetic library. The phonetic library may be seen to represent a substantial number of the target token phonetic library's tokens, i.e. the number of phoneme representations in Table 1, namely twenty-two, represents a large percentage of the number of letters phonemes in the letters in the English-language alphabet, namely twenty-six. Some prior art systems simply distinguished stops, fricatives, etc., at a first level of analysis and token identification. It is believed that empirically proven higher-probability speech recognition is a result, at least in part, of the number, as well as of the formulation, of phoneme classifications performed by token classifying means 14 of the preferred embodiment of the invention.

Those skilled in the arts will appreciate that token- or phoneme-classifying means 14 comprehends a given language alphabet-specific set of plural differentiated phonemes, e.g. the twenty-two phonemes listed in Table 1 as partially representing the twenty-six letters of the English-language alphabet. Phoneme-classifying means 14, whether singularly or jointly with phoneme-reclassifying means 16 (and based also upon inputs from token library 18 as illustrated in FIG. 5), may be thought of as operating to produce a hypothesized representation of the spoken utterance received by speech-recording means 12. For example, the spoken utterance "M/N" preferably is represented phonetically as having plural phoneme segments (q) eh m/n (where the glottal stop may or may not be present). Thus the hypothesized representation of this particular spoken utterance has plural phoneme segments that span a succession of first determined time intervals, e.g. 3-ms time intervals, as may be seen from FIG. 3.

That feature-extracting, or feature-determining part described above of token- or phoneme-reclassifying means 16 may be thought of as means 16a, connected to what may be thought of as token, or language alphabet model library 18, for analyzing the hypothesized phoneme representation over a second succession of determined time intervals that are different from the first determined time intervals to classify selected ones of the phoneme representations as being one of the plural letters in the alphabet. Such organization of phoneme-classifying means and analyzing means effects a high-probability indication of the succession of letters represented by a spoken utterance processed thereby, especially in discriminating the usually difficult-to-discriminate ones of the sound-alike letter pairs.

System 10 in its preferred embodiment further includes what will be referred to herein as alignment means including duration-scoring means for effectively constraining the token reclassifying means in time to produce a higher probability indication whether the recorded utterance represents the one or more tokens, as determined by token classifying means 14 and token reclassifying means 16. Alignment means and duration-scoring means are best illustrated herein by reference to FIG. 3, where it may be seen, for example, that reclassifying means 16 comprehends alignment of the letter pair M/N, wherein [eh] spans frames 136 to 166 and wherein [m/n] spanned frames 167 to 186.

The token score preferably is equal to the product of the [eh] outputs in frames 136 through 166, the [m/n] outputs in frames 167 through 186, the probability that [eh] in M/N has a duration of 30 frames and the probability that [m/n] in M/N has a duration of 20 frames. The result of such alignment is a score that comprehends absolute timing of the [eh] and [m/n] components of the letter M/N. Finally, utterance recognizing means 22 effectively multiplies the various probabilities, or scores, corresponding to the succession of high-probability letters classified by token reclassifying means 16 to determine the highest-probability letter sequence thought to have been uttered, resulting, for example, in retrieval of a name from utterance library 24 that best resembles the letter sequence spelled by a remote user of system 10.

The preferred method of the invention now readily may be understood by reference to the preferred system described in detail above. One way of describing the method of the invention is to see it as representing a computer-implemented method for recognizing and identifying a vocalized component of speech by 1) capturing such a component, e.g. via speech-recording means 12; 2) dividing a time-domain representation of the captured component into plural time frames embracing sub-components of the capture component, e.g as illustrated and described in connection with FIG. 2; 3) processing each such sub-component by classifying it into a set of phonetic "label" scores using a neural network classifier presented with selected features for a temporal window surrounding the time frame e.g. via token-classifying means 14 (wherein preferably processing includes first examining the extent of change in token probabilities as between successive ones of such sub-components to produce segmentation criteria by which said comparing is performed, i.e. performing the above-described, modified Viterbi search); 4) assembling a string of verified ones of such subcomponents, e.g. also via token-classifying means 14 as described in connection with Tables 1 and 2; 5) following the processing-by-comparing and assembling steps 3 and 4, and based upon an analysis of an assembled string of time-connected, verified sub-components, segmenting, or assigning time-based speech-pattern segmentation to, said captured component utilizing a machine-learned (i.e. neural-network-based) capability to relate such time-connected string of verified sub-components to a recognizable speech component, e.g. via token-reclassifying means 16; and 6) analyzing, or assessing, such assigned segmentation to identify the captured component, e.g. via analyzing means 16a.

An alternative way of describing the method of the invention is to characterize it as a method for identifying a vocalized speech component. The method preferably includes segmenting the speech component to produce a representation of the component characterized by plural, time-based segments, as illustrated in FIG. 1; classifying each segment by mapping the same, using a plural target-token vocabulary-based phonetic library to produce a high probability phoneme representation of the component, e.g. by the mapping represented by Tables 1 and 2; and reclassifying the phoneme representation by analyzing, or identifying specific features within, the component based upon the mapping to produce a higher probability identification of the component as corresponding with one token of such target-token library, e.g. via analyzing means 16a.

Those skilled in the arts will appreciate that the target-token library need not be the English-language alphabet, as illustrated herein, but instead may be any desired target library containing tokens sufficiently well defined, e.g. by mapping techniques similar to that illustrated in Tables 1 and 2, that the neural-network system and method of the invention can be trained and thereafter used in the recognition of speech the utterances of which are represented in such target-token library. Such target-token libraries may contain foreign language alphabets, as well as non-alphabet tokens such as words or phrases.

Another important step that may augment the above described steps is the recognition that the probability, or score, produced by neural-network-based system 10 for a given speech component may be higher for silence or noise then it is for a recognizable phoneme or letter, or may indicate that the spoken utternace probably is not a letter at all. This is illustrated in Table 2 as the "SILENCE" and/or "NOISE" output of the letter classifier, and is described in connection therewith as being identified as falling within the "NOT A LETTER" category. This safeguard minimizes the probability of false-positive token identification.

Other additional steps of this preferred method of the invention include identifying specific features within one or more of the determined intervals, such determined intervals being different from the time-based segments, further to discriminate between two or more tokens in such vocabulary, as described in detail above with reference to analyzing means 16a; performing plural such component identifications wherein the various identifications have distinct probabilities that corresponding plural ones of the identifications correspond with plural tokens within predefined token library 18, i.e. producing plural token scores for each segmented token; successively repeating the segmenting, classifying and reclassifying letter identification steps as described and illustrated to recognize the spelled name "K-E-L-L-Y" the successive letters of which are within token library 18 and the letter succession of which is within utterance library 24; and performing plural such utterance identifications wherein the various identifications have distinct probabilities that corresponding plural ones of the identifications correspond with plural utterances within predefined utterance library 24, e.g. producing plural utterance scores for the ambiguous utterances "K-E-L-L-Y" and "K-E-O-L-Y" (a lower one for "K-E-O-L-Y" and a higher one for "K-E-L-L-Y").

It now may be appreciated that the system and method of the invention produce superior speaker-independent speech recognition results than previously was possible. It also will be appreciated that such system and method as are described herein are readily trained to new token libraries, utterance libraries and communication media-based spectral energy characteristics, thus lending them to adaptation in numerous applications that are within the spirit of the invention.

Accordingly, while a preferred system and method of the invention have been described herein, it is appreciated that further modifications are possible that come within the scope of the invention.

It is claimed and desired to secure by letters patent:

1. A computer-implemented method for recognizing and identifying a vocalized component of speech, the method comprising:

capturing such a vocalized component of speech:

dividing a time-domain representation of said captured component into a plurality of time frames embracing a plurality of sub-components of said captured component;

processing each such sub-component by comparing spectral energy contained within a window of time surrounding and including such sub-component with a machine-learned and library-stored set of recognizable, spectral energy-based elemental speech characteristics to locate sub-component segment boundaries defining therebetween an hypothesized speech token that can be matched with a characteristic element in the library;

defining a string of time-connected verified ones of such sub-components:

following said processing, and based upon an analysis of such defined string of time-connected verified sub-components assigning time-based speech-pattern segmentation to said captured component utilizing a machine-learned capability to relate such time-connected string of verified sub-components to a recognizable speech component;

classifying such assigned segmentation into a set of component scores using a neural network classifier presented with selected features based upon the located sub-component segment boundaries produced by said processing, to identify said captured component; and storing said component scores and repeating said capturing, dividing, processing, defining, assigning and classifying steps, thereafter determining the best match between the successive component scores and each of a plural-component recognition library, thereby to recognize a phrase within the plural-component library.

* * * * *